United States Patent [19]

Küttner

[11] Patent Number: 5,778,844
[45] Date of Patent: Jul. 14, 1998

[54] PROCESS AND DEVICE FOR CONTROLLING A HEATING ELEMENT IN A MOTOR VEHICLE

[75] Inventor: Thomas Küttner, Stuttgart, Germany

[73] Assignee: Robert Bosch GmbH, Stuttgart, Germany

[21] Appl. No.: 776,412

[22] PCT Filed: May 22, 1996

[86] PCT No.: PCT/DE96/00940

§ 371 Date: Jan. 28, 1997

§ 102(e) Date: Jan. 28, 1997

[87] PCT Pub. No.: WO96/38665

PCT Pub. Date: Dec. 5, 1996

[30] Foreign Application Priority Data

May 30, 1995 [DE] Germany ............ 195 19 713.5

[51] Int. Cl.⁶ .................. F02N 17/02; F02P 19/02
[52] U.S. Cl. .................. 123/179.6; 123/142.5 E; 123/697; 60/284; 219/205
[58] Field of Search .................. 123/697, 145 A, 123/179.6, 179.21, 142.5 E, 549; 60/284, 300; 219/202–208; 73/23.32; 204/406, 408

[56] References Cited

U.S. PATENT DOCUMENTS 4,221,205  9/1980  Koehler .................. 123/179.21
5,353,775  10/1994 Yamashita et al. .................. 123/697
5,433,072  7/1995  Swars et al. .................. 60/284

FOREIGN PATENT DOCUMENTS 26 59 264   7/1978  Germany.
A 40 15 558 11/1990 Germany.
A 41 00 133  7/1992 Germany.
C 42 23 954  1/1994 Germany.

OTHER PUBLICATIONS

Patent Abstracts of Japan, vol. 11, No. 272, (M622), Sep. 4, 1997, for JP 62-74706 (Uemoto), Apr. 6, 1997, Apr. 1987.

Patent Abstracts of Japan, vol. 7, No. 116, (M–216), May 20, 1983, for JP A58–035273 (Nippo Denso KK), Mar. 1, 1983.

Patent Abstracts of Japan, vol. 6, No. 199, (M–162), Oct. 8, 1983, for JP A57–105566 (Nippo Denso Co Ltd), Jul. 1, 1982.

Patent Abstracts of Japan, vol. 18, No. 323, (M–1624), Jun. 20, 1994, for JP A06–074026 (Matsushita Electric Ind Co Ltd), Mar. 15, 1994.

*Primary Examiner*—Andrew M. Dolinar
*Attorney, Agent, or Firm*—Kenyon & Kenyon

[57] ABSTRACT

A process and a device for controlling a heating element, in particular a glow plug of a self-igniting internal combustion engine, in which the current is allowed to flow through the heating element when a door contact is actuated and another condition is met.

6 Claims, 3 Drawing Sheets

PROCESS AND DEVICE FOR CONTROLLING A HEATING ELEMENT IN A MOTOR VEHICLE

FIELD OF THE INVENTION

Prior Art

The present invention relates to a process and a device for controlling a heating element in a motor vehicle, specifically a glow plug in a diesel engine.

BACKGROUND INFORMATION

A conventional process and a device for controlling a heating element in a motor vehicle is described, for example, in German Patent Application No. 26 59 264, which described a process and a device including a door contact that allows current to flow through the glow plug when the door contact is actuated.

The disadvantage of this device is that every time the door contact is actuated, in particular, when the door is closed, heating is triggered. This results in a heavy burden being placed on the vehicle battery, since heating is triggered, for example, even when the occupant leaves the vehicle.

SUMMARY OF THE INVENTION

The object of the present invention is to provide a process and a device for controlling a heating element in a motor vehicle to make quick start-up possible without placing unnecessary burden on the vehicle battery.

DETAILED DESCRIPTION OF THE INVENTION

The process according to the present invention is explained below using the example of a glow plug of a self-igniting internal combustion engine. The process according to the present invention is, however, not limited to the present application. A similar procedure can also be applied with other heating elements used in motor vehicles. Further advantageous is the procedure of heating a lambda sensor or a catalyst of an externally ignited internal combustion engine. In such case, the lambda sensor or the catalyst is already fully operational when the start-up process begins, which improves the emission characteristics of the internal combustion engine.

Figure 1:
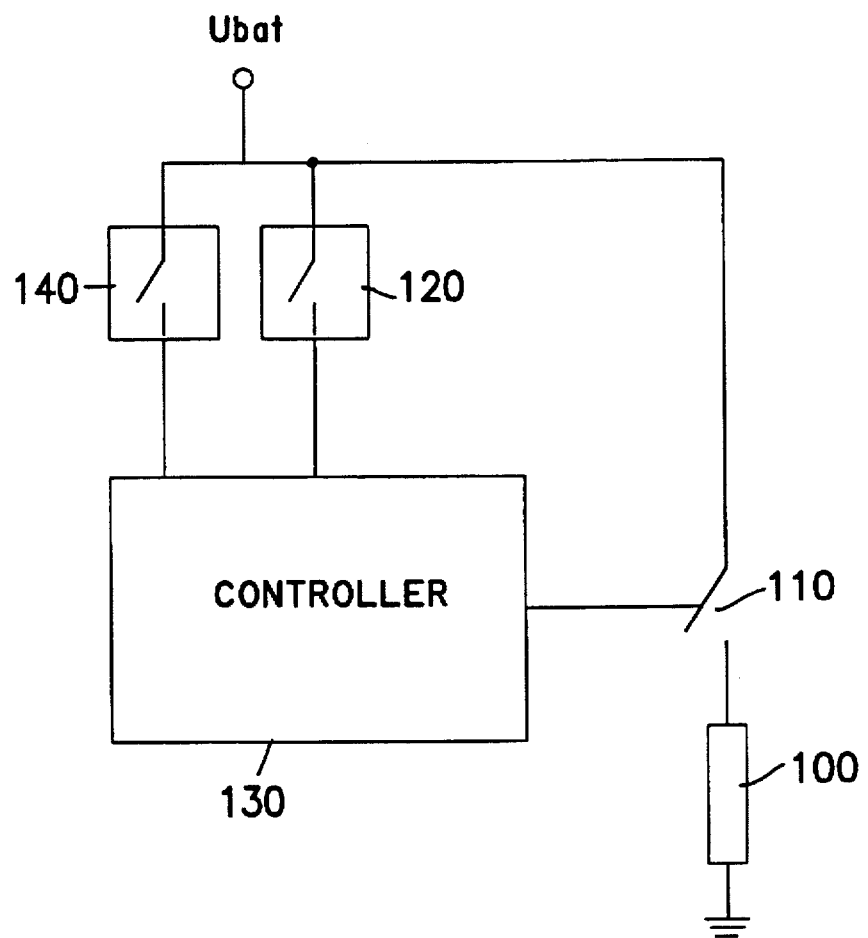
FIG. 1 shows a block diagram of the device according to the present invention.

FIG. 1 shows the essential elements of the device according to the present invention. A heating element 100 is connected to the vehicle body. The second terminal of heating element 100 is connected to a supply voltage Ubat through a first switching means 110.

Supply voltage Ubat is also connected to a controller 130 through a second switching means 120 and a third switching means 140. First switching means 110 receives a control signal from controller 130.

First switching means 110 is preferably a relay or an electronic switch, such as a power transistor, activated by controller 130. Second switching means 120 is a switch coupled to the ignition lock, and can be activated by the driver starting the vehicle. The third switch 140 is a door contact, which can be activated by opening or closing the door. In particular, switch 140 is closed when the door is opened.

In an advantageous embodiment, second switching means 120 and third switching means 140 are provided with a delay function. Thus switching means 120 remains closed for a certain delay period TN even after the driver has actuated the vehicle with the ignition key. The same applies to third switching means 140; thus, third switches mean 140 also remains in its closed position for a certain delay period $T_V$ after the door has been actuated.

Controller 130 activates first switching means 110 depending on the status of second switching means 120 and third switching means 140. The current is allowed to flow through the heating element by actuating first switching means 110.

Figure 2:
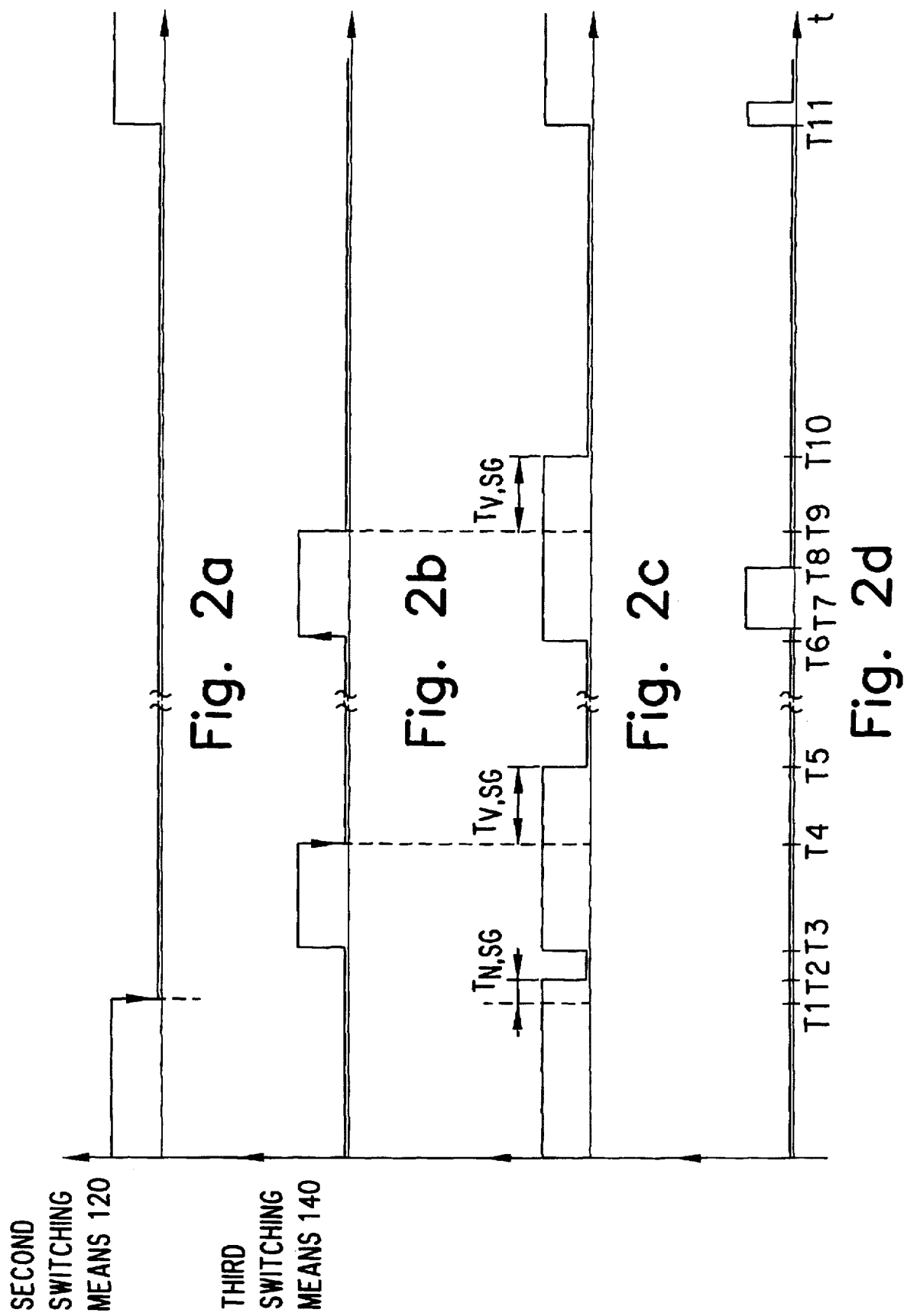
FIGS. 2a, 2b, 2c and 2d shows various signals plotted against time, during the operation of the device according to the present invention.

FIG. 2a–2l show various signals plotted against time. FIG. 2a shows the signal applied to switching means 120. As long as switching means 120 is closed, i.e., the ignition is being actuated, this signal is set high. As long as switching means 120 is open, this signal is set low.

FIG. 2b shows the signal of the third switching means 140, plotted against the position of the door contact. As long as the switching means is open, i.e., the door is closed, the signal is set low. As soon as the switching means is closed, i.e., the door is opened, the signal is set high. FIG. 2c shows the supply voltage applied to controller 130, supplied through switching means 120 and 140.

FIG. 2d shows the actuating signal sent by controller 130 to switching means 110. When this signal is set high, first switching means 110 allows current to flow through the heating element.

Up to time T1, ignition switch 120 is in its actuated position. This means that the controller is in its normal state. Up to this time Ti, the supply voltage signal shown in FIG. 2c is set high. After the elapse of the delay period $T_N$ at time T2, the supply voltage applied to controller 130 drops to zero.

At time T3, the driver opens the door to leave the vehicle, with the result that door contact 140 is actuated and its output signal goes high until time T4. From time T3 on, the supply voltage applied to controller 130 goes high again, dropping low at time T5 after the elapse of the delay period $T_V$. At this time the driver has probably left the vehicle and closed the door.

During the time period between time T5 and T6, the vehicle is stopped. At time T6, the driver opens the driver-side door with the result that the signal on door contact 140 goes high. At the same time, the supply voltage applied to controller 130 goes high. After a brief delay period, at time T7 controller 130 supplies a triggering signal to switching means 110. As a result, heating element 100 is supplied with current between time T7 and time T8. This process is referred to as pre-heating.

Preferably the time period between time T7 and T8 is a fixed period of time, or can be pre-defined as a function of different parameters such as, for example, the ambient temperature. At time T9, the driver closes the driver-side door, with the result that the signal on door contact 140 goes low. After delay period $T_V$, the supply voltage to controller 130 also goes low. Delay period TV is preferably selected so that it is longer than the time period between times T7 and T8. This ensures that even when the door is closed quickly, i.e., time T9 precedes time T8, there is sufficient time to supply current to the heating element.

At time T11 the driver starts by turning on the ignition switch 120 of the vehicle. This results in both the signal of ignition lock 120 and supply voltage 130 go high. Furthermore, at this time T11 switching means 110 can receive current again to execute the normal heating cycle. The internal combustion engine can be started after the completion of the heating cycle. Pre-heating considerably reduces the waiting time and the heating time.

Figure 3:
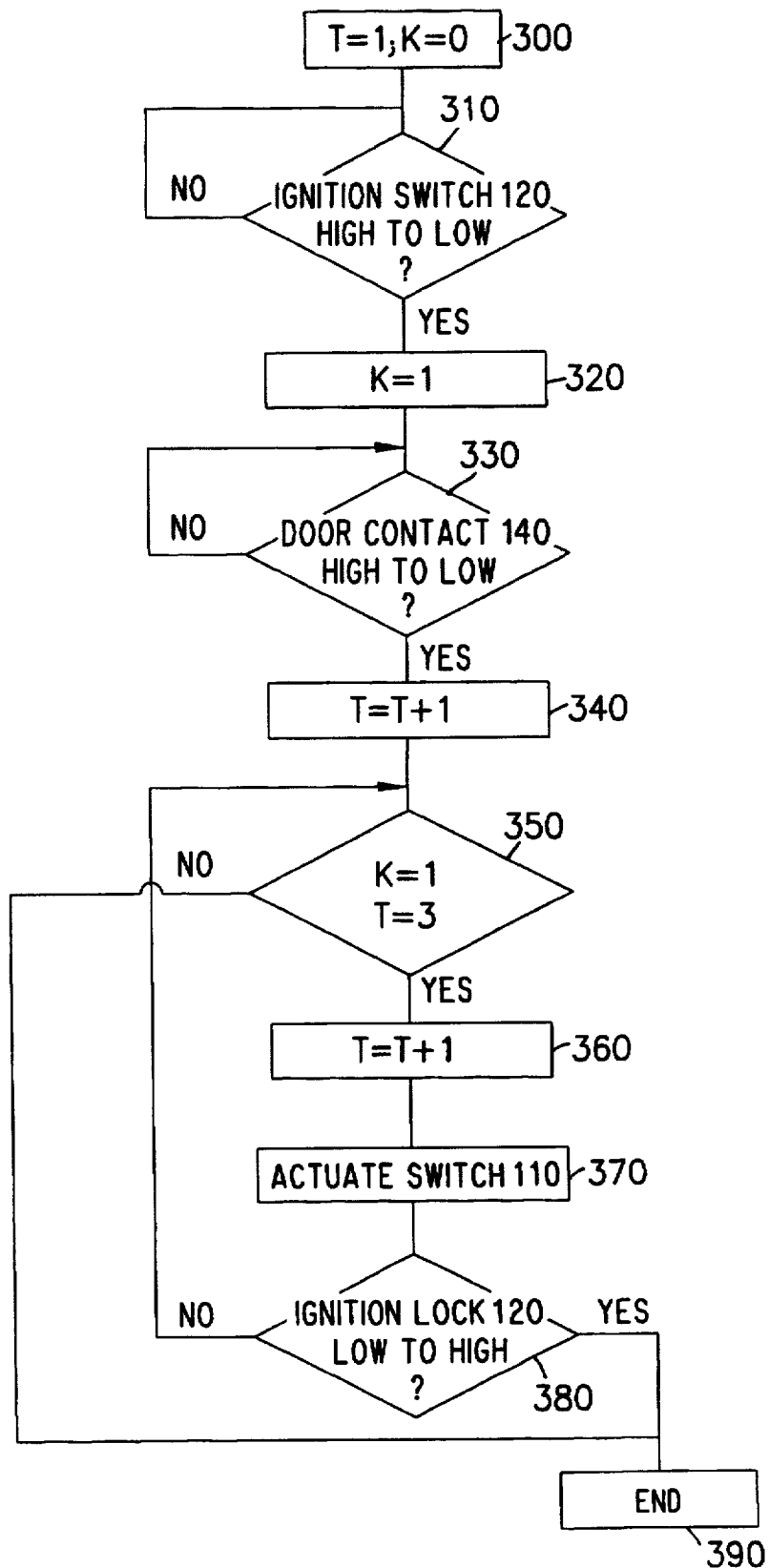
FIG. 3 shows a flow chart showing a process according to the present invention.

FIG. 3 shows the procedure according to the present invention using a flow chart. At the beginning of the program, a counter T is set to 1 and a counter K is set to 0 in first step 300. A subsequent query 310 checks whether the signal has gone from high to low on ignition switch 120. If this is not the case, the query is performed again at a later point in time. If such a change has been detected, a storage device K is set to 1 in a subsequent step 320. This value indicates that the signal has dropped from high to low at ignition switch 120. Query 310 detects that the engine, i.e. controller 130, have been turned off.

Subsequently, query 330 checks whether a change from high to low has occurred on door contact 140. If this is not the case, query 330 is repeated after a predefined time. If such a drop is detected, step 340 follows, where the content of counter T is incremented by 1. Query 330 detects whether the driver has left the vehicle.

Next, query 350 checks whether the value of counter T is equal to 3 and whether counter K has the value 1. If this is not the case, the program is terminated in step 390. If this is the case, counter T is incremented by 1 in step 360. Query 350 detects whether the driver has re-entered the vehicle. Subsequently, in step 370, switch 110 is actuated, allowing current to flow through heating element 100.

Query 380 that follows checks whether the signal at ignition lock 120 has gone from low to high. If this is the case, the program ends with step 390. If this is not the case, query 350 is repeated after a predefined time.

If it is sequentially detected that the ignition switch has been turned off, the driver has left the vehicle and later re-entered it, with these actions occurring in this sequence, it can be assumed that a preheat cycle should be started. The current is allowed to flow in step 370. This means that switch 110 is closed. In one embodiment of the present invention, it can also be provided that controller 130 generates a signal showing that the preheat cycle can begin. If this signal is present, controller 130 activates switch 110 with a suitable mark-space ratio.

If not all actions are detected, or the actions are detected in some other sequence or at a higher frequency, the preheat cycle is not started.

If the driver behaves in an expected manner, i.e., he leaves the vehicle, then re-enters it later and starts the engine, the start time can be considerably reduced by immediately starting the preheat cycle after re-entry.

The preheat cycle is initiated after query 350 only if the shut-off-engine and leave-vehicle actions occur in the predicted sequence.

In the case of a different sequence and/or repeated door contact signals, the preheat cycle is not started when the door contact is actuated.

I claim:

1. A method for controlling a heating element in a motor vehicle, comprising the steps of:

actuating at least one door contact of the motor vehicle;

changing a state of an additional member of the motor vehicle, the additional member including an ignition lock member; and providing a current flow through the heating element to start a preheat cycle when the door contact is actuated and the state of the additional member is changed in a predetermined time sequence.

2. The method according to claim 1, wherein the current flow is provided through the heating element when the door contact is actuated at least twice after the state of the ignition lock member has changed.

3. A method for controlling a heating element in a motor vehicle, comprising the steps of:

actuating at least one door contact of the motor vehicle;

changing a state of an additional member of the motor vehicle; and providing a current flow through the heating element to start a preheat cycle when the door contact is actuated and the state of the additional member is changed in a predetermined time sequence, wherein the heating element includes a glow plug of a self-igniting internal combustion engine.

4. A device for controlling a heating element of a motor vehicle, comprising:

at least one door contact;

an additional switching member, the additional switching member including an ignition lock member; and a controller for providing a current flow through the heating element when the door contact is actuated and a state of the additional switching member changes in a predetermined time sequence.

5. A device for controlling a heating element of a motor vehicle, comprising:

at least one door contact;

an additional switching member; and a controller for providing a current flow through the heating element when the door contact is actuated and a state of the additional switching member changes in a predetermined time sequence;

wherein the heating element includes a glow plug of a self-igniting internal combustion engine.

6. A device for controlling a heating element of a motor vehicle, comprising:

at least one door contact;

an additional switching member; and a controller for providing a current flow through the heating element when the door contact is actuated and a state of the additional switching member changes in a predetermined time sequence;

wherein the heating element heats at least one of a lambda sensor and a catalyst.

* * * * *

UNITED STATES PATENT AND TRADEMARK OFFICE
CERTIFICATE OF CORRECTION

PATENT No. : 5,778,844

DATED : July 14, 1998

INVENTOR(S): T. KÜTTNER

It is certified that error appears in the above-identified patent and that said Letters Patent is hereby corrected as shown below:

Column 1, line 7, delete "Prior Art";

Column 1, line 36, "shows" should be --show--;

Column 1, line 57, delete "essential";

Column 2, line 10, "TN" should be --$T_N$--;

Column 2, line 12, "switches" should be --switching--;

Column 2, line 21 "Fig. 2a-2l" should be --Figs. 2a-2d--; and

Column 2, line 39, "Ti" should be --T1--.

Signed and Sealed this

Ninth Day of February, 1999

Attest:

*Acting Commissioner of Patents and Trademarks*

*Attesting Officer*